US010257907B2

(12) United States Patent
Beij et al.

(10) Patent No.: US 10,257,907 B2
(45) Date of Patent: Apr. 9, 2019

(54) LED LIGHTING MODULE

(71) Applicant: SIGNIFY HOLDING B.V., Eindhoven (NL)

(72) Inventors: Marcel Beij, Sint Oedenrode (NL); Bertrand Johan Edward Hontele, Breda (NL); Patrick Alouisius Martina De Bruycker, Nuenen (NL); Dmytro Viktorovych Malyna, Achel (BE); Dalibor Cvoric, Utrecht (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/739,806

(22) PCT Filed: Jun. 13, 2016

(86) PCT No.: PCT/EP2016/063524
§ 371 (c)(1),
(2) Date: Dec. 26, 2017

(87) PCT Pub. No.: WO2016/207013
PCT Pub. Date: Dec. 29, 2016

(65) Prior Publication Data
US 2018/0192485 A1 Jul. 5, 2018

(30) Foreign Application Priority Data
Jun. 25, 2015 (EP) ...................................... 15173897

(51) Int. Cl.
*H05B 33/08* (2006.01)
*H05B 37/02* (2006.01)
(Continued)

(52) U.S. Cl.
CPC ....... *H05B 33/089* (2013.01); *H05B 33/0812* (2013.01); *H05B 33/0851* (2013.01);
(Continued)

(58) Field of Classification Search
CPC ............ H05B 33/0815; H05B 33/0845; H05B 33/0812; H05B 33/089; H05B 33/0809;
(Continued)

(56) References Cited

U.S. PATENT DOCUMENTS 8,450,936 B1 * 5/2013 Stopa ................. H05B 33/0809
315/169.1
9,320,098 B2 * 4/2016 Yoo ...................... H05B 33/083
(Continued)

FOREIGN PATENT DOCUMENTS

CN      102630115 B  *  2/2014
DE   102009003632 A1     9/2010
(Continued)

*Primary Examiner* — Vibol Tan
(74) *Attorney, Agent, or Firm* — Akarsh P. Belagodu

(57) ABSTRACT

The invention describes an LED lighting module (1) comprising input terminals (13$_{hi}$, 13$_{lo}$) for connecting to an input voltage (U$_{in}$); an LED load (10) realized to operate at an upper threshold voltage level (V$_{dim}$); and a regulation circuit (11, 12) realized to decrease LED current (I$_{LED}$) through the LED load (10) when the input voltage (U$_{in}$) is greater than the upper threshold voltage level (V$_{dim}$). The invention further describes an LED lighting arrangement (4) and a method of driving an LED load (10).

13 Claims, 4 Drawing Sheets

(51) Int. Cl.
*F21K 9/238* (2016.01)
*F21K 9/232* (2016.01)
*F21Y 115/10* (2016.01)
*F21K 9/235* (2016.01)

(52) U.S. Cl.
CPC ......... H05B 37/02 (2013.01); H05B 37/0263 (2013.01); *F21K 9/232* (2016.08); *F21K 9/235* (2016.08); *F21K 9/238* (2016.08); *F21Y 2115/10* (2016.08)

(58) Field of Classification Search
CPC ............ H05B 33/0851; H05B 33/0824; H05B 33/0887; H05B 33/0848; H05B 37/02; H05B 33/0821; H05B 33/0842; H05B 33/0854; H05B 37/0263; Y02B 20/345; Y02B 20/347; F21K 9/235; F21K 9/238; F21K 9/232; F21Y 2115/10
See application file for complete search history.

(56) References Cited

U.S. PATENT DOCUMENTS

| | | | |
|---|---|---|---|
| 9,730,283 B2* | 8/2017 | Lee | H05B 33/0815 |
| 9,820,349 B2* | 11/2017 | Shteynberg | H05B 33/083 |
| 9,907,139 B2* | 2/2018 | Chao | H05B 33/0887 |
| 2008/0180387 A1 | 7/2008 | Liao et al. | |
| 2009/0261748 A1 | 10/2009 | McKinney et al. | |
| 2011/0001554 A1* | 1/2011 | Hamada | H01L 27/0222 327/536 |
| 2011/0109244 A1 | 5/2011 | Grajcar | |
| 2012/0176038 A1* | 7/2012 | Cheon | H05B 33/0812 315/122 |
| 2012/0188487 A1* | 7/2012 | Hagino | H05B 33/0812 349/69 |
| 2013/0093340 A1* | 4/2013 | Horino | H05B 33/083 315/193 |
| 2014/0062317 A1* | 3/2014 | Lee | H05B 33/083 315/185 R |
| 2014/0084798 A1 | 3/2014 | Wang et al. | |
| 2015/0351193 A1* | 12/2015 | Chao | H05B 33/0887 315/122 |
| 2016/0227617 A1* | 8/2016 | Kim | H05B 33/0845 |

FOREIGN PATENT DOCUMENTS

| | | |
|---|---|---|
| WO | WO2014088947 A1 | 6/2014 |
| WO | 2014151262 A1 | 9/2014 |

* cited by examiner

LED LIGHTING MODULE

CROSS-REFERENCE TO PRIOR APPLICATIONS

This application is the U.S. National Phase application under 35 U.S.C. § 371 of International Application No. PCT/EP2016/063524, filed on Jun. 13, 2016, which claims the benefit of European Patent Application No. 15173897.8, filed on Jun. 25, 2015. These applications are hereby incorporated by reference herein.

FIELD OF THE INVENTION

The invention describes an LED lighting module, an LED lighting arrangement, and a method of driving an LED load.

BACKGROUND OF THE INVENTION

LEDs are becoming more widely used as light sources, and are attractive owing to their long lifetime and low power consumption. A number of LEDs and a driving circuit can be incorporated in a "retrofit" light bulb, for example to replace a less energy-efficient incandescent light bulb. An incandescent lamp can be driven directly from an AC mains voltage, for example 240 V. A halogen lamp is generally driven from a transformer which lowers the input voltage level. These types of power supply are not suitable for an LED, which requires a relatively low DC voltage to operate safely. There are various ways of using LEDs with existing power supplies. For example, multiple LEDs can be used in a configuration to match the high input voltage. Alternatively, driver electronics can be placed between the power supply and the LED light source to convert the input voltage and current to suitable and safe levels.

An LED load will emit light when the voltage across the LED load exceeds a certain minimum. As the voltage increases, the LED current increases accordingly, resulting in more light output. Generally, the input voltage should not exceed a rated voltage level, since excessively high LED current ultimately decreases the lifetime of the LED. For these reasons, it is important that the voltage across an LED load is maintained at or below the rated level, and that the LED current does not exceed a recommended drive level. This can be achieved in a number of ways. In one approach, the LED current can be controlled in a relatively straightforward manner using a semiconductor switch such as a bipolar junction transistor (BJT) in series with the LED load, and by applying an appropriate voltage to the base of the BJT to regulate the amount of current passed by the switch. A current control circuit regulates the BJT base voltage to ensure that the LED current remains constant over the input voltage range between the minimum level and the rated level. When the input voltage exceeds the rated voltage, LED current remains constant, and the excess power is dissipated by the current control circuit. As a result, this control approach is associated with unfavourably high losses.

In configurations comprising a variable number of LED lamps in parallel for example in a lighting fixture with a parallel arrangement of retrofit LED bulbs the power supply must deliver a constant voltage, but current regulation must be done at each individual LED lamp. In order to control the light output of the LED lamps, i.e. to increase or decrease their light output as desired, usually the supply voltage is the only available control parameter, so that voltage controlled dimming is the technique generally used. However, in the case of LED loads, the desire to limit the driver losses conflicts with the control range and linearity of the LED lighting arrangement.

Therefore, it is an object of the invention to provide an alternative way of regulating the current through an LED load.

SUMMARY OF THE INVENTION

The object of the invention is achieved by the LED lighting module of claim 1; by the LED lighting arrangement of claim 7; and by the method of claim 11 of driving an LED load.

According to the invention, the LED lighting module comprises input terminals for connecting to an input voltage; an LED load realised to operate at a nominal voltage level; and a regulation circuit realised to decrease LED current through the LED load when the input voltage is greater than the nominal voltage level.

An LED load can comprise one or more LED light sources, e.g. one or more LED semiconductors mounted in any suitable configuration on a circuit board. In the context of the invention, the nominal voltage or rated voltage is to be understood to mean the maximum or recommended voltage that should be applied to the LED load. An advantage of the LED lighting module according to the invention is that, with relatively little effort and low cost, it can provide over-voltage protection to the LEDs and/or can be made compatible with existing circuitry, e.g. a lighting fixture incorporating a legacy high-frequency transformer for halogen lamps, a phase-cut dimmer, etc. This will be explained in more detail below. The core idea of the invention is to recognise an increase in voltage above the nominal voltage level, and to down-regulate the LED current in response to the higher input voltage. This technique of down-regulating or decreasing the LED current in response to an increased input voltage is referred to in the following as "reverse voltage dimming".

According to the invention, the LED lighting arrangement comprises such an LED lighting module; and also a conversion module realised to raise the input voltage of the LED lighting module above an upper threshold voltage level of the LED lighting module on the basis of a dim input signal to the LED lighting arrangement.

The LED lighting arrangement according to the invention presents an attractive alternative for low-voltage replacement or "retro-fit" lamps such as MR16 lamps. A retro-fit lamp must be compatible with the fixture with which it will be used, and much effort is invested in ensuring this compatibility. The LED lighting arrangement according to the invention ensures that the LEDs are protected against over-voltage, and can also be realized to cooperate with an existing dimming regulator of a lighting fixture. Another advantage of the LED lighting arrangement according to the invention is that the proposed circuitry can be realized in a very compact fashion, so that even miniature retro-fit lamps such as candelabra lamps are made possible.

According to the invention, the method of driving an LED load—realised to operate at a nominal voltage level—comprises the steps of connecting the LED load to an input voltage; and decreasing LED current through the LED load when the input voltage is greater than the nominal voltage level.

An advantage of the method according to the invention is that a very straightforward but effective LED current control is possible, and can be used under various circumstances such as protecting the LEDs from an overvoltage and/or making an LED lighting arrangement compatible with an existing fixture in a cost-effective manner and/or providing a dimming function for an existing lighting circuit that does not physically incorporate a dimmer.

The dependent claims and the following description disclose particularly advantageous embodiments and features of the invention. Features of the embodiments may be combined as appropriate. Features described in the context of one claim category can apply equally to another claim category.

In a preferred embodiment of the invention, the regulation circuit of the LED lighting module is realised as part of an over-voltage protection circuit of an LED lighting arrangement. In another preferred embodiment of the invention, the regulation circuit of the LED lighting module is realised as part of a dimmer circuit of an LED lighting arrangement. Therefore, the LED lighting arrangement according to the invention can be realised to support a dimming function without any undesirable electromagnetic interference (EMI) or the audible humming associated with pulse-width modulation (PWM) dimming circuitry. Of course, these functions—over-voltage protection and dimming—may even be combined in the inventive LED lighting arrangement.

In the following, the expression "upper threshold voltage level" is to be understood as the voltage level above which the regulation circuit will down-regulate the LED current. The upper threshold voltage level can be the same as the LED nominal voltage. For example, for a string of three 3 V LEDs (i.e. each LED has a forward voltage of 3 V), the regulation circuit can commence down-regulation of the LED current when the input voltage to the LED module increases above 9.0 V, since the nominal voltage for the LED string is 9 V. An alternative definition of the "upper threshold voltage level" can also take into account any additional voltage overhead or "headroom" that may be required by the regulation circuit.

In a preferred embodiment of the invention, the LED load is connected in series with a first semiconductor switch and a current sense resistor, and the regulation circuit comprises a current control circuit with a reference input and a variable input, which current control circuit is realized to regulate LED current through the first semiconductor switch according to a difference between the reference input and the variable input. The regulation circuit further comprises a voltage monitor circuit realized to generate the variable input to the current control circuit according to an input voltage applied to the LED lighting module and an upper threshold voltage level.

As described above, the LED current can be controlled in a relatively straightforward manner using a semiconductor switch such as a BJT in series with the LED load, and applying an appropriate voltage to the BJT base terminal to regulate the amount of current passed by the switch. A current sense resistor in series with the switch can provide a measure of the current through the LED load. In a preferred embodiment of the invention, the variable input to the current controller is a common node connecting the current sense resistor and the voltage monitor circuit.

In the context of the invention, an input dimming signal or dim input can be interpreted as a control signal to achieve a corresponding boosted voltage. For example, a dimmer might operate on the basis of a potentiometer that delivers a dim level input signal in the form of a voltage in a range between a low voltage and a high voltage, corresponding to a dim range between a low dim setting and a high dim setting. In a preferred embodiment of the invention, the LED lighting arrangement comprises an interface circuit for converting the dim level input signal into a control signal of the voltage boost module. In the following, it may be assumed that full light output corresponds to a 0% dim level, while zero light output corresponds to a 100% dim level. Full light output is achieved when the LED current is at its nominal drive level; zero light output is achieved when the LED current is reduced to a level at which the LEDs are effectively "off".

Preferably, the voltage monitor circuit is realized to raise the voltage level at the variable input to the current control circuit when the input voltage exceeds the upper threshold voltage level. This can be achieved using any appropriate circuitry. In a particularly preferred embodiment of the invention, the voltage monitor circuit comprises a programmable shunt regulator to fulfil this function. The programmable shunt regulator is preferably connected via its cathode to the input voltage terminal of the lighting arrangement. A closed-loop feedback connection to a reference terminal of the shunt regulator and its anode is formed by a voltage divider. By appropriate choice of resistor values, the voltage divider can set the upper threshold level beyond which the current down-regulation should commence. In the following, the upper threshold voltage level may also be referred to as a "dim trigger level", since the LED current—and therefore also the light output of the LED module—is reduced when the input voltage rises above this level.

There are various possible ways of performing LED current control on the basis of a reference input and a control input. For example, the reference input can be an internal node inside a current control circuit. In an alternative approach, a microprocessor could be used to monitor the supply voltage and to adjust the LED current accordingly.

In a particularly preferred embodiment of the LED module according to the invention, the current controller comprises a comparator realised to compare the variable input with the reference input, and wherein the gain of the comparator is controlled by the input voltage. For example, a single-supply op amp can be used, with its positive supply terminal connected to the input voltage terminal. The magnitude of the output signal of the op amp will depend on the difference between its inputs, and also on its gain which, in this configuration, is determined by the input voltage. Such a realisation is relatively economical to realise, compared to a more complex arrangement based on a microprocessor.

During "normal" operation of the LED lighting module, the input voltage will not exceed the upper threshold level. The variable input to the current controller will therefore deliver a measure of the current through the LEDs via the current sense resistor. In a preferred embodiment of the invention, the comparator will act under these circumstances to adjust the BJT base terminal voltage in order to keep the LED current at an essentially constant drive level. Once the input voltage exceeds the upper threshold voltage level, the comparator will act to adjust the BJT base terminal voltage in order to reduce the LED current. For example, for an NPN transistor switch, reducing the base terminal voltage will reduce the current through the switch.

The LED current can be regulated in any suitable fashion when the input voltage exceeds the dim trigger level. For example, the LED current could be reduced abruptly once the input voltage has increased above the dim trigger level. Alternatively, the LED current could be reduced in a stepwise fashion as the input voltage increases above the dim trigger level. In a particularly preferred embodiment of the invention, the LED current is reduced linearly as the input voltage increases above the upper threshold voltage level. In this way, the LED current steadily decreases as the input voltage steadily increases.

Preferably, the current controller and voltage monitor are realized to result in the LED current decreasing to zero as the input voltage approaches a maximum input voltage value. In other words, above a certain level of input voltage, the LED load is switched off and does not emit light.

In a preferred embodiment of the invention, the voltage monitor and current controller are realised as part of an over-voltage protection circuit, using the control techniques described above to protect the LEDs from an excessively high current, which might otherwise lead to thermal runaway and device failure.

The linear relationship between input voltage and LED current can be used to good effect when the LED lighting arrangement is to have dimming capability. Therefore, in a further preferred embodiment of the invention, the voltage monitor and current controller are realised as part of a dimmer circuit. This might be realised in a number of ways. For example, the LED lighting arrangement may be used in lighting circuit that already includes a dimmer. To this end, the LED lighting arrangement according to the invention preferably comprises a converter circuit for converting a dim setting signal output by the dimmer to an increased input voltage. Preferably, such a converter circuit is realised to increase the input voltage as the dim setting decreases. In other words, a desired low dim level will result in a correspondingly high input voltage. An adjustment of the dim setting will result in a corresponding adjustment to the input voltage.

Light sources such as incandescent lamps or halogen lamps can be dimmed using various techniques such as phase-cut dimming of an AC input, PWM, etc. An LED light source is generally dimmed using a PWM technique or a current control technique since an LED load is usually driven from a fixed DC voltage. When an LED light source is used in a retrofit lamp to replace an incandescent lamp, an electronic driver circuit is required to convert the mains input to an essentially constant DC input voltage and to control the LED current. A dimmer may be incorporated into such a driver. In a preferred embodiment of the invention, a dimming capability may be built into the LED lighting arrangement by including a converter circuit as described above between the driver and the LED lighting arrangement in order to boost the DC voltage (supplied by the driver) above the threshold level in response to a dim input signal.

The LED lighting module and LED lighting arrangement according to the invention also allow PWM control input at a fixed input voltage. For example, a PWM duty cycle of about 40% will reduce the average LED current and therefore also the light output to about 40% of their nominal levels. Dimming the LED lighting module using the PWM control will not activate or trigger the voltage monitor circuit of the regulation circuit, so that current regulation is only performed on the basis of the PWM dim setting and power losses in the series transistor switch are reduced according to the dimming level. This dimming control method is an alternative approach for low-voltage retrofit lamps such as MR16 lamps.

The LED lighting arrangement according to the invention is preferably realised as a retrofit LED lamp, with a connector for insertion into a socket of a lighting fixture. The connector can be any standard connecter such as a bi-pin, bayonet, or threaded connector. For example, the LED lighting arrangement according to the invention can be realized as an MR 16 lamp with a GU 10 connector to replace a halogen lamp.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
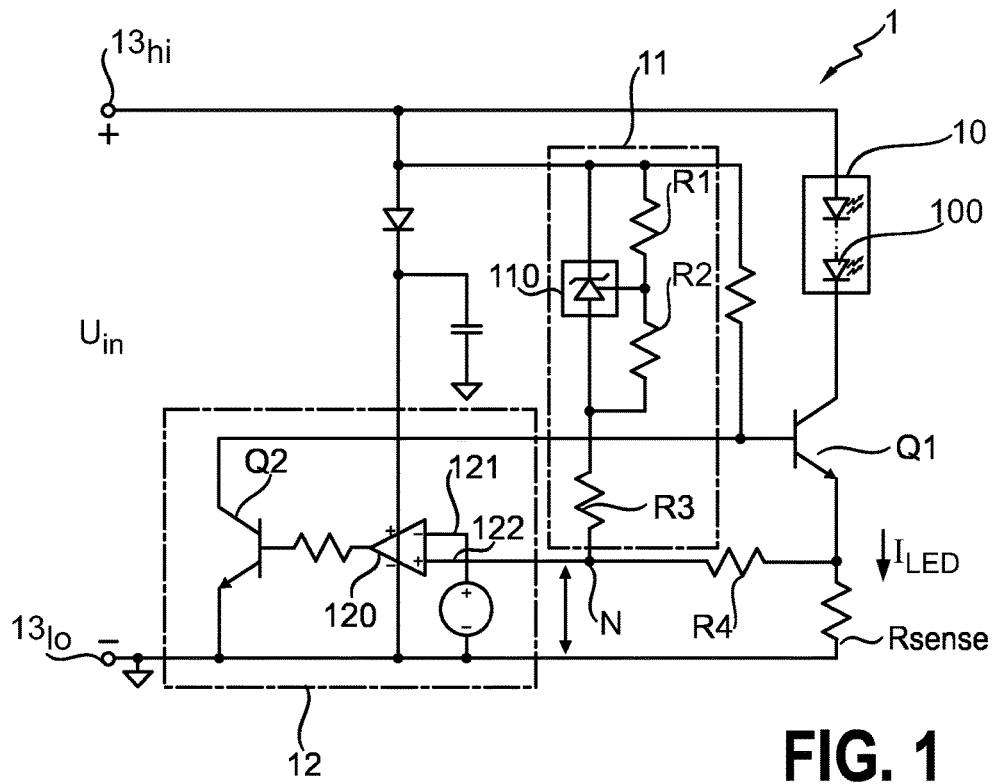
FIG. 1 is a circuit diagram of a first embodiment of the LED lighting module according to the invention.

FIG. 1 is a circuit diagram of a first embodiment of the LED lighting module 1 according to the invention, showing an LED load 10 comprising a number of LEDs 100, and a regulation circuit 11, 12 comprising a voltage monitoring circuit 11 and a current control circuit 12. Output terminals of a suitable DC power supply can be connected to input terminals $13_{hi}$, $13_{lo}$ of the LED lighting module 1. The LED load 10 is connected in series with a first semiconductor switch Q1 and a current sense resistor $R_{sense}$. The first semiconductor switch Q1 is an NPN BJT, and its base terminal is connected to the output of the current control circuit 12.

The current control circuit 12 comprises an operational amplifier 120 and a second semiconductor switch Q2. A reference input 121 of the operational amplifier 120 is connected to a constant voltage, i.e. a reference level, indicated by the voltage supply symbol. The positive supply terminal of the operational amplifier 120 is connected to the positive input voltage terminal, and the negative supply terminal is connected to ground.

The size of the current sense resistor $R_{sense}$ determines the default or nominal LED drive current. The current sense resistor $R_{sense}$ assists in regulating the LED current $I_{LED}$ to the essentially constant drive level during normal operation of the lighting arrangement. To this end, the current sense resistor $R_{sense}$ is connected via node N to a control input 122 of the current control circuit 12.

The node N is also connected to the voltage monitor circuit 11, which is realized as a programmable shunt regulator 110. As long as the input voltage $U_{in}$ is below an upper threshold level set by a voltage divider arrangement R1, R2, the voltage at node N (and therefore the "current control level" of the control input 122 to the op amp 120) will change only in response to an alteration in LED current $I_{LED}$. The operational amplifier 120 reacts to any slight difference between the voltages at the reference input 121 and control input 122 by adjusting the base terminal voltage of the second transistor switch Q2, thereby indirectly adjusting the base terminal voltage of the first transistor switch Q1. Therefore, as long as the input voltage $U_{in}$ is above a certain minimum level (depending on the number of LEDs in the LED load 10) and below the upper threshold level, the LED current $I_{LED}$ will remain essentially constant at the drive level, and the light output will also remain essentially constant at 100% light output. The upper threshold level or dim trigger level is the nominal or rated voltage for the LED load 10.

The closed-loop behavior of the circuit comprising the current sense resistor $R_{sense}$, the operational amplifier 120 and the second transistor switch Q2 always tries to keep the voltage at the control input 122 equal to the voltage at the reference input 121 or "current control level". In other words, the closed-loop behavior acts to correct the voltage at the current control level to make it equal to the reference voltage.

When the input voltage $U_{in}$ increases above the threshold voltage, the shunt regulator 110 of the voltage monitor circuit 11 will increase its passing current. This passing current will raise the voltage at node N, since it is creating an additional voltage drop across resistor R4 and current sense resistor $R_{sense}$. In other words, the shunt regulator 110 will pull the voltage at the control input 122 above the reference level. As a result, the current through the current sense resistor $R_{sense}$ must decrease to bring the voltage at the control input 122 back to the reference level. The increased voltage at the control input 122 to the operational amplifier 120 increases the voltage at the base of the second transistor switch Q2, so that it sinks more current, thereby lowering the voltage at the base terminal of the first transistor switch Q1, and decreasing the LED current $I_{LED}$. The reduction in LED current $I_{LED}$ results in a decreased or dimmed light output. The current control circuit 12 effectively responds to a change in voltage drop between node N and ground (indicated by the arrow), and strives to keep the voltages at the reference input 121 and the control input 122 at the same level.

Resistor R4 is chosen to be much larger than the current sense resistor $R_{sense}$ to ensure that a small current flowing through the shunt regulator 110 will create a large drop in LED current $I_{LED}$. In this way, the total current flow through the circuit will decrease.

The process of decreasing LED current $I_{LED}$ as the input voltage increases will continue until the first transistor switch Q1 is effectively turned off, resulting in 0% light output (100% dimming). While the LED current is being down-regulated by the "reverse voltage dimming", the power dissipation of the first transistor Q1 will also decrease, and drops to 0 W when the LED current $I_{LED}$ reaches 0 mA.

The dim trigger level, i.e. the level of input voltage $U_{in}$ at which the "dimming" of the LED load 10 commences, can be set by appropriate values for the resistors R1, R2, R3, R4.

Figure 2:
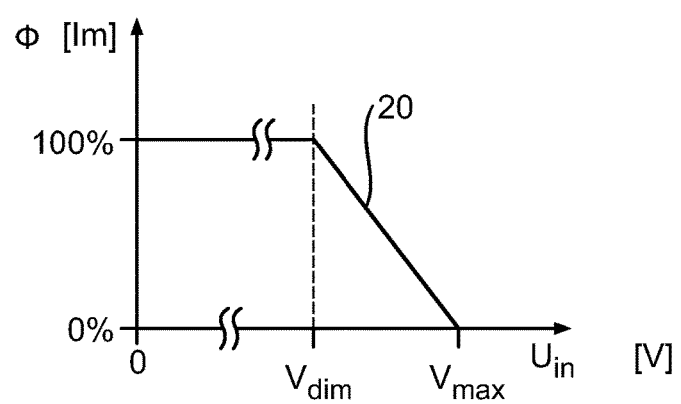
FIG. 2 shows a graph illustrating the operation of an LED lighting module according to the invention.

The principle of operation of the LED lighting module 1 is shown in FIG. 2. Here, a graph 20 shows the light output [%] against the voltage $U_{in}$ applied to the LED lighting module 1. Up to and below the upper threshold voltage level or "dim trigger level" $V_{dim}$, the light output is at 100% or full light output. When the voltage $U_{in}$ increases above the upper threshold voltage level $V_{dim}$, the light output starts to decrease. As the voltage $U_{in}$ approaches a maximum $V_{max}$, the light output approaches zero. Since an increased input voltage $U_{in}$ results in a decreased current through the LED load 10, over-voltage protection can be achieved in a simple and elegant manner. Equally, to decrease the light output of the LED load 10, the voltage $U_{in}$ can be deliberately increased: this is the "reverse-voltage dimming" principle of the invention. Contrary to the established principles of driving an LED module, the voltage to the LED module can be deliberately increased above the nominal voltage without incurring any damage to the LEDs, and the over-voltage protection functionality can double as a dimming functionality. The relatively simple circuitry used to achieve these effects makes the inventive LED module attractive regarding cost and function.

The boost converter 11 and the dimming module 12 are preferably realised to match each other in performance, e.g. so that the boost converter 11 is realised to increase the voltage over a certain span or range (for example 3.0 V), and the dimming module 12 (which is driven from an output terminal of the boost converter 11) is realised to decrease the LED current $I_{LED}$ over the complete dimming range from the drive level (100% light output) to off (0% light output).

Figure 3:
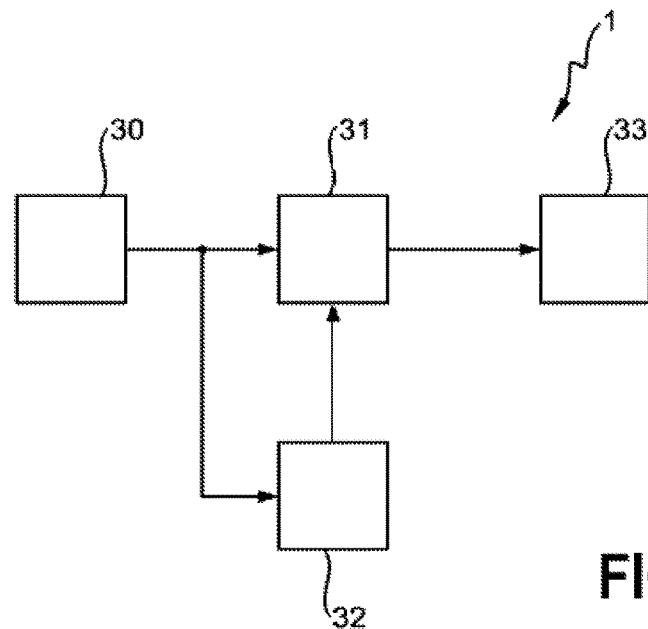
FIG. 3 shows a block diagram representing the functional elements of an LED lighting module according to the invention.

FIG. 3 shows a block diagram representing the functional elements of an LED lighting arrangement 1 according to the invention. An input voltage is supplied at a first stage 30, which can comprise a connection to mains, a connection to a rectified mains voltage, etc. The input voltage supplied by stage 30 should increase linearly through an upper threshold level upper threshold level $V_{dim}$, to a maximum level $V_{max}$. A current control stage 31 and a voltage monitor stage 32 perform as described above to regulate the LED current through an LED load stage 33.

Figure 4:
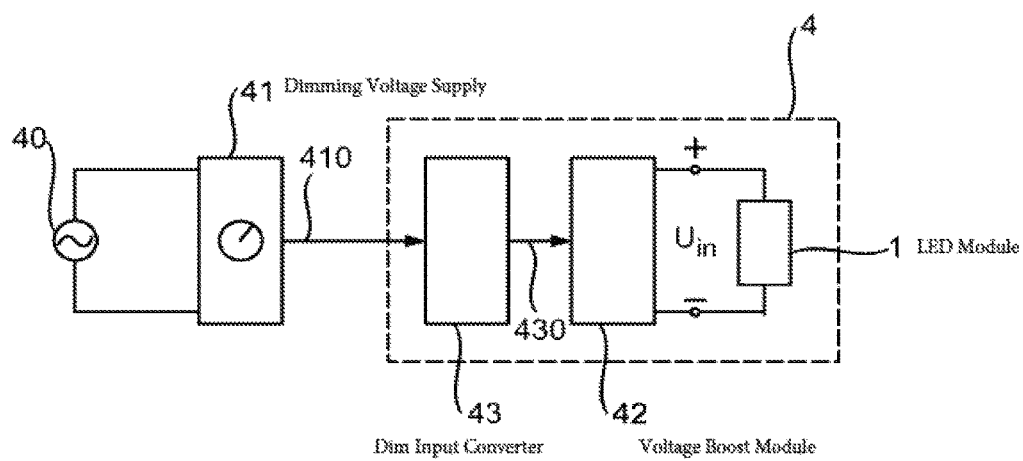
FIG. 4 is a block diagram of an embodiment of the LED lighting arrangement according to the invention.

FIG. 4 is a simplified block diagram of one embodiment of the LED lighting arrangement 4 according to the invention. In this exemplary embodiment, the LED lighting arrangement 4 can be used in conjunction with a dimming voltage supply 41 realized to provide the nominal voltage of the LED module 1 at full light output. In response to a user's chosen dim setting, the dimming voltage supply 41 provides a dim input signal 410 to the LED lighting arrangement 1, where it is converted by a dim input converter 43 into a control signal for a voltage boost module 42. The dim input converter 43 "translates" the desired reduced light output (i.e. the dim setting) into a control signal 430 that causes the voltage at the output of the voltage boost module to increase according to the reverse voltage dimming principle of the invention as described above. The conversion circuit 43 and voltage boost module 42 are realized to convert a dim setting of 100% to an input voltage $U_{in}$ at the upper threshold level $V_{dim}$ as shown in FIG. 2 above; and to convert a dim setting lower than 100% (for example 80% light output, 60% light output, etc.) to an input voltage $U_{in}$ that is greater than the upper threshold level $V_{dim}$, resulting in reduced LED current and correspondingly reduced light output, as explained above in FIG. 1. A dim setting of 0%, corresponding to zero light output, will be converted to the maximum voltage $V_{max}$ at the upper limit of the voltage range shown in FIG. 2. In this exemplary embodiment, the LED lighting arrangement 4 includes an LED lighting module 1 as well as a conversion circuit 43 and voltage boost module 42, as indicated by the broken line.

Figure 5:
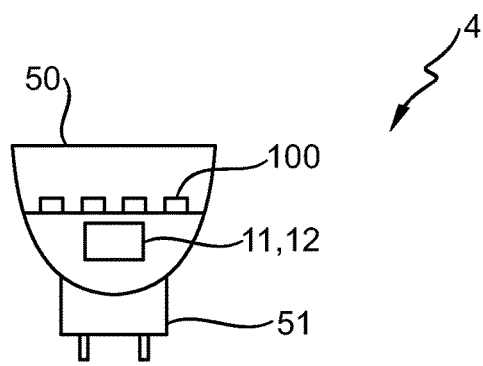
FIG. 5 is a schematic representation of an LED lighting arrangement according to a the invention, realized as a retrofit lamp.

FIG. 5 is a schematic representation of the LED lighting arrangement 4 according to the invention, realized as a retrofit lamp. Here, the LEDs 100 of the LED load are mounted in a reflector lamp housing 50. The control circuitry—including the current control circuit 12 and the voltage monitor circuit 11—of the LED lighting module is arranged as appropriate in the base of the housing 50. The retrofit lamp can have a suitable connector interface, shown in this example as a bi-pin connector 51. The control circuitry of the LED lighting arrangement 4 according to the invention can be very compact, so that retrofit miniature lamps are possible.

Figure 6:
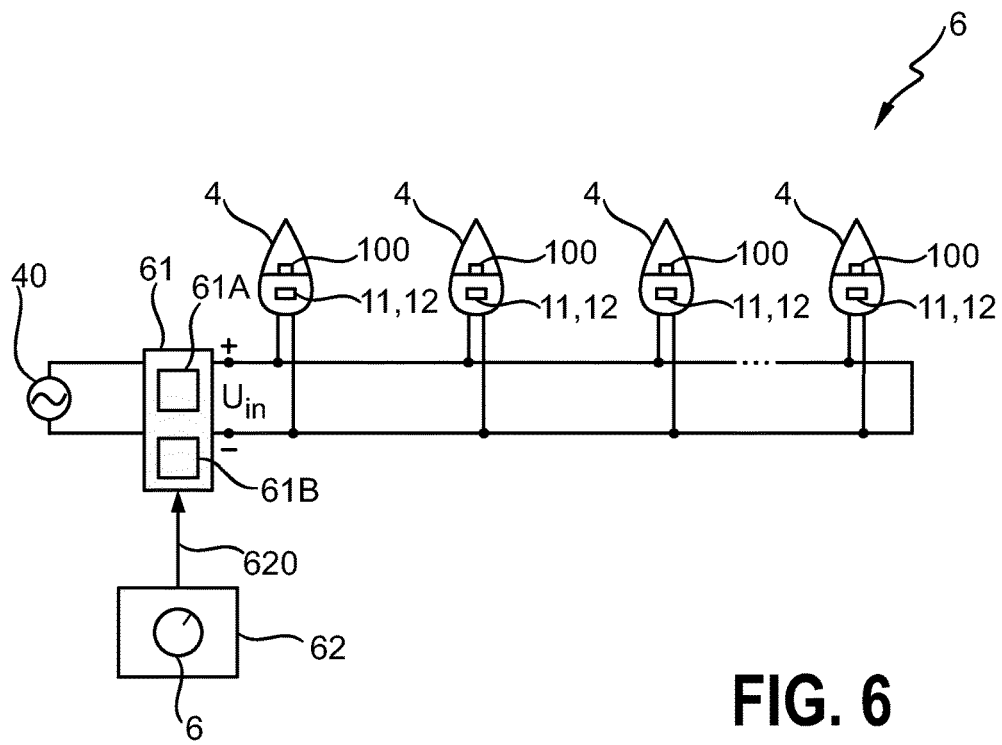
FIG. 6 is a schematic representation of a lighting fixture comprising retrofit embodiments of the LED lighting arrangement according to the invention.

FIG. 6 is a schematic representation of a lighting fixture 6 comprising several retrofit candelabra light bulbs 4. Each retrofit candelabra lightbulb 4 can comprise a miniature housing enclosing one or more LEDs 100 and a regulation circuit 11, 12 arranged in the base of the lamp housing. In this embodiment, a physically separate drive circuit 61 is connected to a mains power supply 40, and is realised to convert the AC mains voltage to a suitable DC input $U_{in}$ to the retrofit lamps 4. To this end, the drive circuit 61 comprises a voltage boost module 61A and a dim signal converter 61B. The dim signal converter 16 converts a dim input signal 620 to a switch control signal of the boost converter 61A in response to a user input. The dim input signal 620 can be a wireless signal originating from a hand-held controller 62 such as a smartphone, etc. with a software "dimmer" 6 installed as a dimming app. In response to a dim setting selected by the user, the voltage boost module 61A raises the input voltage $U_{in}$ to a level that will achieve the desired drop in light output, or lowers the input voltage $U_{in}$ to a level that will achieve the desired increase in light output. The output voltage range of the voltage boost module 61A lies between the dim trigger level $V_{dim}$ and the maximum level $V_{max}$ as explained with FIG. 2 above.

The LED control technique described in the context of the invention can be highly miniaturized, particularly compared to the known mains voltage dimmable candelabra lamps. A more miniature realization can result in a very appealing lamp design. In a further development, the power converter unit 61 can be located unobtrusively in a central location of the lighting fixture, for example in a suspension fixture of a chandelier. During development of the inventive LED lighting arrangement, it has been observed that sufficient voltage margin is present to mitigate voltage drop over power cables in most practicable situations.

Figure 7:
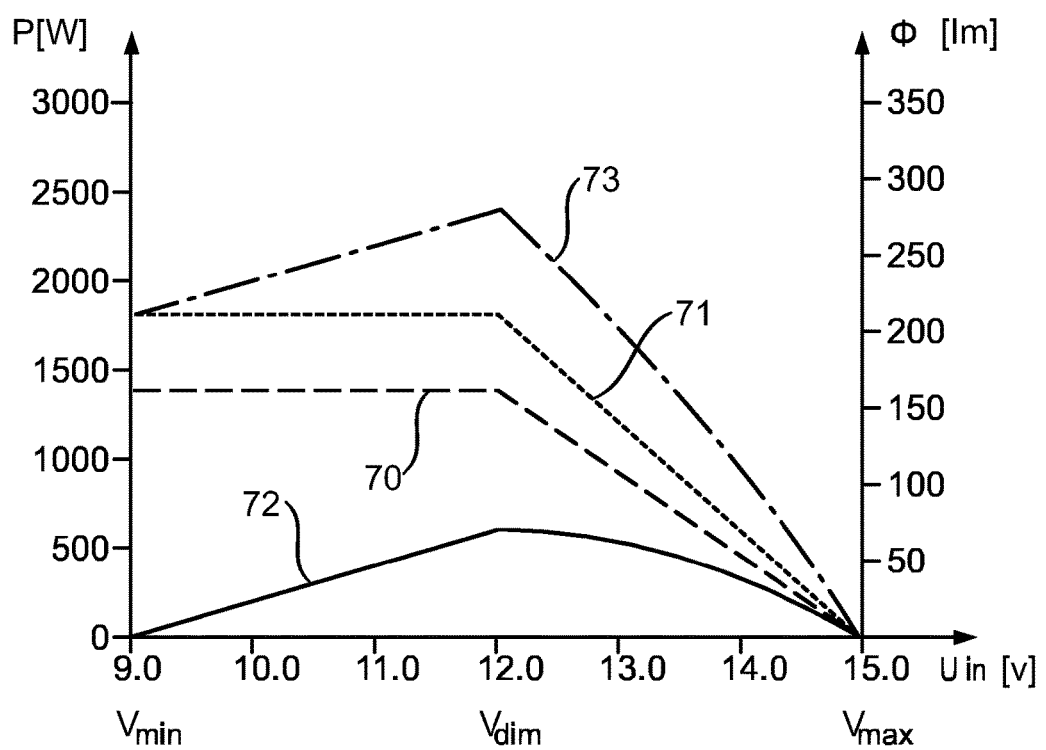
FIG. 7 shows further graphs relating to the operation of the LED lighting module according to the invention.

FIG. 7 shows further graphs of light output [lm] and power [W] against input voltage $U_{in}$ [V], demonstrating the effect of the LED lighting module according to the invention. The diagram shows a graph 70 of light output, indicating that the light output is constant as long as the input voltage $U_{in}$ lies between a minimum level $V_{min}$ (9 V in this example) and a maximum level $V_{max}$ (15 V in this example). In this interval, the LED current is regulated to its essentially constant drive level. Once the input voltage $U_{in}$ reaches an upper threshold level $V_{dim}$ (12 V in this example), the voltage monitor circuit and current control circuit act to decrease the LED current $I_{LED}$ according to the input voltage. The higher the input voltage $U_{in}$, the lower the LED current $I_{LED}$. The LED current $I_{LED}$ is reduced to 0 mA when the input voltage $U_{in}$ reaches maximum level $V_{max}$. In this example, a "dim range" is set over a 3 V range from 12 V up 15 V. When the input voltage $U_{in}$ exceeds the minimum level $V_{min}$, the switch Q1 starts to dissipate the extra power given by $U_{in} \cdot I_{LED}$. When the input voltage exceeds the nominal operating voltage, i.e. the upper threshold level $V_{dim}$, the "dim trigger level" is reached and the current control module reduces the LED current $I_{LED}$ via switch Q1. The diagram shows a graph 71 of power dissipated by the circuit, a graph 72 of power dissipated by the LED load, and a graph 73 of total power losses. Once the reverse voltage dimming sets in, the power losses of the LED lighting arrangement start to decrease, unlike similar conventional LED circuits, which still exhibit high power consumption even when the light output is reduced.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An LED lighting module comprising:
   a plurality of input terminals for connecting to an input voltage;
   an LED load realised to operate at an upper threshold voltage level and arranged in series with a first semiconductor switch and a current sense resistor; and
   a regulation circuit comprising a current control circuit to regulate LED current and a voltage monitor circuit to generate a variable input to the current control circuit, wherein the regulation circuit is realised to decrease LED current through the LED load when the input voltage is greater than the upper threshold voltage level,
   wherein the current control circuit comprises a reference input and a variable input, the current control circuit being realized to regulate LED current through the first semiconductor switch according to a difference between the reference input and the variable input, and
   wherein the voltage monitor circuit generates the variable input to the current control circuit based at least in part on the input voltage applied to the LED lighting module and the upper threshold voltage level.

2. The LED lighting module according to claim 1, wherein the voltage monitor circuit is realized to raise the voltage at the variable input when the input voltage applied to the LED lighting module exceeds the upper threshold voltage level.

3. The LED lighting module according to claim 1, wherein the voltage monitor circuit comprises a programmable shunt regulator.

4. The LED lighting module according to claim 1, wherein the current control circuit comprises a comparator realised to compare the variable input with the reference input, and wherein the gain of the comparator is controlled by the input voltage.

5. The LED lighting module according to claim 4, wherein the comparator is connected to decrease the current through the first semiconductor switch when the input voltage exceeds the upper threshold voltage level.

6. A LED lighting arrangement, comprising
   an LED lighting module according to claim 1; and
   a conversion module realised to raise the input voltage of the LED lighting module above an upper threshold voltage level of the LED lighting module on the basis of a dim input signal to the LED lighting arrangement.

7. The LED lighting arrangement according to claim 6, realised as a retrofit LED light bulb, with connectors for insertion into a socket of a lighting fixture.

8. The LED lighting arrangement according to claim 6, wherein the regulation circuit of the LED lighting module is realised as part of an over-voltage protection circuit.

9. The LED lighting arrangement according to claim 6, wherein the regulation circuit of the LED lighting module is realised as part of a dimmer circuit of an LED lighting arrangement comprising the LED lighting module.

10. A method of driving an LED load of a LED lighting module, the LED load realised to operate at an upper threshold voltage level, which method comprises the steps of
connecting, with a plurality of input terminals, the LED lighting module to an input voltage, and further connecting the LED load in series with a first semiconductor switch and a current sense resistor;
generating, with a voltage monitor circuit, a variable input to a current control circuit based on the input voltage applied to the LED lighting module and the upper threshold voltage level;
regulating, with the current control circuit, LED current through the first semiconductor switch according to a difference between a reference input and the variable input; and
regulating, with a regulation circuit comprising the current control circuit and the voltage monitor circuit, the LED current such that the LED current through the LED load decreases when the input voltage is greater than the upper threshold voltage level.

11. The method according to claim 10, comprising the step of maintaining the LED current at an essentially constant drive level when the input voltage is less than the upper threshold voltage level.

12. The method according to claim 10, wherein the LED current is decreased linearly as the input voltage increases above the upper threshold voltage level.

13. The method according to claim 10, comprising the step of reducing the LED current to zero as the input voltage reaches a maximum input voltage value.

\* \* \* \* \*